Patented Sept. 4, 1945

2,384,239

UNITED STATES PATENT OFFICE 2,384,239

POLYMERIC MATERIAL OBTAINED BY POLYMERIZING A MIXTURE OF A CONJUGATED DIENE AND A CYCLIC IMIDE OF AN OLEFINIC DICARBOXYLIC ACID

George Lowrance Dorough, Wilmington, Del., assignor to E. I. du Pont de Nemours & Company, Wilmington, Del., a corporation of Delaware No Drawing. Application January 2, 1941, Serial No. 372,817

3 Claims. (Cl. 260—78)

This invention relates to improvements in the manufacture and application of new synthetic rubber-like materials.

Synthetic rubber-like materials have been made by the polymerization of various unsaturated aliphatic hydrocarbons or their derivatives, but the synthetic materials which have proved the most valuable are those made by polymerizing butadiene-1,3 together with other polymerizable substances including styrene or derivatives of methacrylic or acrylic acids such as their nitriles or esters and the like, and those made by polymerizing 2-chlorobutadiene-1,3 (chloroprene). These rubber-like materials have a very important advantage over natural rubber in that they are much less affected by oils and solvents. However, the products made from butadiene and also from 2-chlorobutadiene-1,3 are often much more difficult to process than natural rubber unless special methods of polymerization, e. g., the use of certain modifying agents, are used.

Chloroprene and butadiene-1,3 have been interpolymerized with minor proportions of other polymerizable substances such as esters of acrylic and methacrylic acids, styrene, methyl vinyl ketone, acrylonitrile and methacrylonitrile, etc., in order to obtain valuable synthetic rubber-like materials. Such interpolymers are often much superior to natural rubber in their resistance to swelling in oils or solvents, but further improvements are desired since many industrial uses for synthetic rubber are dependent on this advantage.

It is an object of this invention to provide new polymeric materials. Another object is to provide rubber-like polymeric materials. A further object is to provide rubber-like polymeric materials having improved oil and solvent resistance. Other objects will appear hereinafter.

These objects have been accomplished by polymerizing a mixture of a butadiene; i. e., a compound containing, in an open chain, the nucleus:

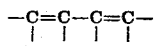

and a cyclic imide of an olefinic dicarboxylic acid in which at least one carbonyl group is conjugated with an ethylenic double bond. The polymerization is preferably carried out in aqueous emulsion. The rubber-like polymeric material, which may be obtained by coagulating the resulting dispersion, shows especially good working properties and may be compounded and cured readily by processes known to the art.

In order that the invention may be more fully understood, the following examples are given by way of illustration, but it is to be understood that the invention is not limited thereto, as will become more apparent hereinafter. The term "parts," whenever hereinafter used, signifies parts by weight.

Example I

This example illustrates the interpolymerization of chloroprene with a N-alkyl maleic imide in a system modified with p-toluene sulfinic acid.

A mixture of 20 parts of N-n-butyl maleic imide and 80 parts of chloroprene was emulsified in a mixture comprising 223 parts of water, 6.1 parts of a 65 per cent solution of the sodium salt of the sulfate ester of oleyl acetate, 1 part of the sodium salt of a sulfonated naphthalene-formaldehyde condensation product, 1 part of sodium p-toluene sulfinate, and 0.54 part of concentrated hydrochloric acid. The whole was quickly emulsified by rapid stirring and maintained at a temperature of 40° C. for approximately 1½ hours. Since the polymerization proceeds exothermically, it was necessary to use external cooling for a short time after the temperature had reached 40° C. After 1½ hours, all but 25 cc. of the latex was stabilized with 2 cc. of a 50 per cent dispersion of a 55:45 mixture of phenyl alpha-naphthylamine and diphenylamine and with 8 cc. of a 25 per cent solution of tetrabutylthiuram disulfide. On coagulation of either the stabilized or unstabilized latex with ethyl alcohol and saturated sodium chloride solution, soft, plastic, rubber-like products were obtained. The main product was readily washed with water on a corrugated rubber mill until essentially free of soap and then dried by milling on a warm smooth rubber mill. During the latter operation 1 per cent of phenyl beta-naphthylamine and 1 per cent of tetramethylthiuram disulfide were incorporated with the polymer before it was completely dry. The 25 cc. sample of latex was coagulated, washed, and dried without the addition of stabilizers or antioxidants and finally analyzed for nitrogen. A total yield of 98 parts of a soft, plastic, coherent, rubber-like interpolymer was obtained which contained 20.3 per cent of N-n-butyl maleic imide. The interpolymer exhibited satisfactory tack and excellent milling properties. The product was compounded on a small, smooth rubber mill as follows:

| | Parts |
|---|---|
| Polymer | 10 |
| Magnesium oxide | 1 |
| Zinc oxide | 0.5 |
| Wood rosin | 0.5 |
| Carbon black | 3.6 |

After curing the compounded stock for 60 minutes at 130° C., a vulcanizate having a satisfactory modulus, good tensile strength and elongation was obtained. The vulcanizate exhibited only 33.7 per cent increase in volume after immersion in kerosene for 48 hours at 100° C., where, as a comparable vulcanizate of pure chloroprene, rubber exhibited approximately 65 per cent increase in volume under the same conditions.

Example II

A mixture of 15 parts of N-ethyl maleic imide and 60 parts of chloroprene was emulsified and polymerized in the same manner as illustrated in Example I. The emulsion was maintained at 40° C. for 1 hour and 10 minutes and the resulting rubber-like latex was then stabilized, coagulated, washed, dried and compounded in the same manner as employed for the N-n-butyl maleic imide/chloroprene interpolymer described above. An 88 per cent yield of interpolymer was obtained which, according to its analysis for nitrogen, contained 16.7 per cent, by weight, of N-ethyl maleic imide. After compounding as illustrated in Example I, the material was cured for 30 minutes at 145 C. to yield a rubber-like vulcanizate which exhibited only 29.9 per cent increase in volume after immersion in kerosene for 48 hours at 100° C. The vulcanizate exhibited an elongation of 540 per cent under a stress of 2800 pounds per square inch. It is noteworthy that N-ethyl maleic imide, on a weight basis, is more effective for the production of oil-resistant chloroprene rubbers than N-n-butyl maleic imide. N-methyl maleic imide is even more effective than N-ethyl maleic imide as will be observed from the following example.

Example III

A mixture of 15 parts of N-methyl maleic imide and 85 parts of chloroprene was emulsified and polymerized in the same manner as illustrated in Example I for N-n-butyl maleic imide and chloroprene. The emulsion was maintained at 40° C. for 2 hours and the resulting rubber-like latex was then stabilized, coagulated, washed, dried, and compounded as indicated in Example I. An 82.7 per cent yield of soft, plastic, coherent, rubber-like polymer was obtained which contained 9.6 per cent of N-methyl maleic imide by weight, as determined by nitrogen analysis. After compounding as illustrated in Example I and curing for 30 minutes at 145° C., an excellent vulcanizate was obtained which exhibited only 30.4 per cent increase in volume after immersion in kerosene for 48 hours at 100° C. The vulcanizate possessed a tensile strength of 3700 pounds per square inch at 560 per cent elongation.

In this and the preceding two examples, 1 per cent (based on the total weight of polymerizable monomers) of sodium p-toluene sulfinate was employed as an auxiliary modifying agent in the aqueous phase of the emulsion system. The use of this modifying agent or others such as free sulfur, hydrogen sulfide, mercaptans, or other sulfur-containing organic materials, is generally desirable, if not necessary, for the production of chloroprene polymers or interpolymers which are sufficiently plastic to be readily worked on the usual rubber mills. This increased plasticity results further in superior moduli of the final vulcanizates. As already pointed out, however, when mixtures of chloroprene and cyclic imides of olefinic dicarboxylic acids are polymerized, the use of sulfur or sulfur-containing modifying agents is not necessary, for the imides themselves act as efficient and satisfactory modifying agents, resulting in rubbers which are sufficiently plastic to be worked with ease and yielding vulcanizates having excellent moduli. This unusual effect obtained through interpolymerization of chloroprene with maleic imides is illustrated in the following example.

Example IV

This example illustrates the polymerization of a mixture of chloroprene and a N-alkyl maleic imide in an acidic unmodified emulsion system.

A mixture of 10 parts of N-methyl maleic imide and 90 parts of chloroprene was emulsified in a mixture comprising 223 parts of water, 6.1 parts of a 65 per cent solution of the sodium salt of the sulfate ester of oleyl acetate and 1 part of the sodium salt of a sulfonated naphthalene-formaldehyde condensation product. After emulsifying by rapid stirring, the mixture was maintained at a temperature of 40° C. for approximately 1¾ hours and the latex was then stabilized, coagulated, washed, and dried, and compounded as illustrated in Example I. The raw stock was sufficiently soft and plastic to be handled with ease during washing, drying, and compounding on the corrugated and smooth mills. A 90.1 per cent yield of solid polymer was obtained which contained 6.73 per cent of N-methyl maleic imide by weight as determined by a nitrogen analysis. The polymer was compounded according to the standard formula given in Example I. After curing for 30 minutes at 145° C., a vulcanizate was obtained which exhibited only 40.9 per cent in volume after immersion in kerosene for 48 hours at 100° C. The vulcanizate showed a satisfactory modulus (300 per cent elongation under a stress of 1930 pounds per square inch) and excellent tensile strength (4050 pounds per square inch) at 475 per cent elongation.

Example V

This example illustrates the polymerization of a mixture of chloroprene and a N-aryl maleic imide.

A mixture of 7.5 parts of N-phenyl maleic imide and 30 parts of chloroprene was emulsified in a mixture comprising 83 parts of water, 2.3 parts of a 65 per cent solution of the sodium salt of the sulfate ester of oleyl acetate, 0.38 part of the sodium salt of a sulfonated naphthalene-formaldehyde condensation product, 0.38 part of sodium p-toluene sulfinate and 0.21 part of concentrated hydrochloric acid. The mixture was emulsified by rapid stirring and maintained at a temperature of 40° C. for approximately 1⅓ hours and then stabilized with 0.75 cc. of a 50 per cent dispersion of a 55:45 mixture of phenyl alpha-naphthylamine and diphenylamine and with 3 cc. of a 25 per cent solution of tetrabutylthiuram disulfide. The resultant latex was coagulated, washed, and dried in the usual manner. An 88 per cent yield of solid polymer was obtained which contained 18.8 per cent of N-phenyl maleic imide, by weight, as determined by a nitrogen analysis. After compounding as illustrated in Example I and curing for 30 minutes at 145° C., a vulcanizate was obtained which exhibited only 21.7 per cent increase in volume after immersion in kerosene for 48 hours at 100° C. The vulcanizate possessed good tensile strength and excellent extensibility.

Example VI

This example illustrates the polymerization of a mixture of chloroprene and a N-cycloalkyl maleic imide.

A mixture of 7.5 parts of N-cyclohexyl maleic imide and 30 parts of chloroprene was emulsified and polymerized in the same manner as illustrated in Example V. The polymerization was run for 1½ hours at 40° C. and then stabilized, coagulated, washed and dried. A 95 per cent yield of solid polymer was obtained which contained 18.3 per cent of N-cyclohexyl maleic imide, by weight, as determined by nitrogen analysis. After compounding, using the standard formula given in Example I, and curing for 30 minutes at 145° C., a good vulcanizate was obtained which exhibited only 39.3 per cent increase in volume after immersion in kerosene for 48 hours at 100° C. The vulcanizate exhibited a tensile strength of 2810 pounds per square inch at 470 per cent elongation.

Example VII

This example illustrates the polymerization of a mixture of chloroprene and a N-cyano-alkyl-substituted maleic imide.

A mixture of 7.5 parts of N-beta-cyanoethyl maleic imide and 90 parts of chloroprene was emulsified and polymerized in the same manner as illustrated by Example I. The N-beta-cyanoethyl maleic imide was not completely soluble in the chloroprene and the resulting emulsion contained some solid imide suspended in it. There was only slight precoagulation during the polymerization. The polymerization was run for 1¼ hours at 40° C. and the latex was then stabilized, coagulated, washed, and dried. An 84 per cent yield of solid polymer was obtained which contained approximately 4.8 per cent of N-beta-cyanoethyl maleic imide, by weight, as determined by a nitrogen analysis. After compounding, as illustrated in Example I, and curing for 30 minutes at 130° C., a vulcanizate was obtained which exhibited only 48.4 per cent increase in volume after immersion in kerosene for 48 hours at 100° C. The vulcanizate possessed a tensile strength of 3280 pounds per square inch at 480 per cent elongation.

Example VIII

This example illustrates the polymerization of a mixture of chloroprene and maleic imide.

A mixture of 2.2 parts of maleic imide and 52.7 parts of chloroprene was emulsified and polymerized in the same manner as illustrated in Example I. The maleic imide was not completely soluble in the chloroprene. The polymerization was run for 2 hours at 40° C. and the latex was then stabilized, coagulated, washed, and dried. A 90 per cent yield of solid polymer was obtained which contained 2.1 per cent of maleic imide, by weight, as determined by a nitrogen analysis. After compounding, using the standard formula given in Example I, and curing for 30 minutes at 130° C., a vulcanizate was obtained which exhibited 53.1 per cent increase in volume after immersion in kerosene for 48 hours at 100° C.

Although the compounding formula given in Example I has been found to be satisfactory for the vulcanization of interpolymers of chloroprene and olefinic cyclic imides, it is to be understood that other formulae may also be employed such as those commonly employed in the vulcanization of natural rubber or of other synthetic rubber-like polymers and interpolymers. Thus, vulcanizates may be obtained which are valuable in a wide selection of applications in view of their different properties resulting from major or minor variations in the compounding formulae and/or cures. Excellent vulcanizates which show improved kerosene resistance, good stress-strain properties and other rubber-like properties may be obtained by omitting carbon black from compounded stocks. The compounding of the above interpolymer of chloroprene and maleic imide, omitting the carbon black, yields an excellent vulcanizate characterized by a higher modulus than is usually obtained with comparable vulcanizates of pure chloroprene rubber. The vulcanizate exhibited 300 per cent elongation under a stress of 1005 pounds per square inch and a tensile strength of 2820 pounds per square inch at 560 per cent elongation.

Example IX

This example illustrates the polymerization of a mixture of chloroprene and a N-unsaturated alkyl maleic imide.

A mixture of 2.5 parts of N-allyl maleic imide and 22.5 parts of chloroprene was emulsified and polymerized in the same manner as illustrated in Example I. The imide was readily soluble in chloroprene. The polymerization was run for 1½ hours at 40° C. and the latex was then stabilized, coagulated, washed and dried. A 90 per cent yield of solid polymer was obtained which contained 8.6 per cent of N-allyl maleic imide, by weight, as determined by a nitrogen analysis. After compounding and curing, a vulcanizate was obtained which possessed good tensile strength and extensibility and exhibited only 39.4 per cent increase in volume after immersion in kerosene for 48 hours at 100° C.

Example X

This example illustrates the polymerization of a mixture of chloroprene and a N-alkyl maleic imide in the presence of another polymerizable substance.

A mixture of 10 parts of N-n-butyl maleic imide, 15 parts of di-2-nitrobutyl fumarate and 75 parts of chloroprene was emulsified and polymerized in the same manner as illustrated in Example I. The polymerization was run for approximately an hour at 40° C. and the latex was then stabilized, coagulated, washed, and dried. A 97 per cent yield of solid rubber-like polymer was obtained which, when compounded by the formula of Example I, was found to cure very quickly. After curing for 15 minutes at 109° C., a vulcanizate was obtained which exhibited only 16 per cent increase in volume after immersion in kerosene for 48 hours at 100° C. The vulcanizate possessed a tensile strength of 3265 pounds per square inch at 330 per cent elongation.

Example XI

This example illustrates the polymerization of a mixture of butadiene-1,3 and N-cycloalkyl maleic imide in a sodium oleate emulsion system.

A mixture of 7.5 parts of N-cyclohexyl maleic imide and 17.5 parts of butadiene-1,3 was emulsified in a mixture comprising 29 parts of water, 0.265 part of solid sodium hydroxide, 1 part of oleic acid, 0.25 part of the sodium salt of a sulfonated naphthalene-formaldehyde condensation product, 0.25 part of ammonium persulfate and 0.125 part of octyl mercaptan. The emulsion was placed in a closed vessel which was rotated end over end for 16 hours in a bath maintained at a temperature of 60° C. The latex was then stabilized by adding 2.5 cc. of a 25 per cent dispersion of a 55:45 mixture of phenyl alpha-naphthylamine and diphenylamine, coagulated, washed with water and alcohol on a corrugated rubber mill and brought to constant weight on a warm smooth rubber mill. A 36 per cent yield of a soft, slightly tacky, coherent polymer was obtained which, according to its nitrogen analysis, contained 44.5 per cent of N-cyclohexyl maleic imide. The polymer was compounded as follows:

|  | Parts |
|---|---|
| Polymer | 10 |
| Phenyl beta-naphthylamine | 0.2 |
| Carbon | 5.0 |
| Stearic acid | 0.2 |
| 2-Mercaptobenzothiazole | 0.1 |
| Zinc oxide | 0.5 |

After curing for 30 minutes at 140° C., a vulcanizate having fairly satisfactory tensile strength and elongation was obtained.

A 40 per cent yield of interpolymer containing 47.25 per cent of N-cyclohexyl maleic imide was obtained using an acidic emulsion system in which N-hydroxy propyl C-cetyl betaine was used in place of sodium oleate as an emulsifying agent. The interpolymer was similar in properties to that obtained using the above basic emulsion system.

Polymerization of a mixture of 17.5 parts of butadiene-1,3 and 7.5 parts of N-methyl citraconic imide in the manner described above gave a 44 per cent yield of a soft coherent rubber-like polymer which possessed good working properties. The interpolymer contained 48 per cent of N-methyl citraconic imide according to its nitrogen analysis.

Although the above examples relate particularly to materials obtained by polymerizing chloroprene or butadiene-1,3 mixed with maleic imides or citraconic imides, the invention is not limited thereto.

The polymeric materials within the scope of the invention include those having, as the butadiene component, compounds containing, in an open chain, the nucleus:

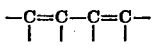

Examples of suitable compounds are butadiene-1,3, 2-methylbutadiene-1,3 (isoprene), 1-methylbutadiene-1,3 (piperylene), 2,3-dimethylbutadiene-1,3, 1,4-dimethylbutadiene-1,3, 1,1-dimethylbutadiene-1,3, 1-phenylbutadiene-1,3, 2-phenylbutadiene-1,3, 1-furylbutadiene-1,3, 2-chlorobutadiene-1,3 (chloroprene), 2-bromobutadiene-1,3, 2-iodobutadiene-1,3 2-chloro-3-methylbutadiene-1,3, 1-methyl-2-chlorobutadiene-1,3, 1-cyanobutadiene-1,3, 2-cyanobutadiene-1,3, 2-methoxybutadiene-1,3, 2-ethoxybutadiene-1,3, and the like. Of the various conjugated butadienes which are applicable, isoprene, butadiene, and particularly chloroprene are preferred. The invention is not limited to a pure butadiene, but is applicable to a mixture of two or more butadienes in the presence or absence of other inert materials.

The polymeric materials within the scope of the invention include those having, as the imide component, a cyclic imide of an olefinic dicarboxylic acid in which at least one carbonyl group is conjugated with an ethylenic double bond. The N-substituted imides of this class are preferred, particularly the N-substituted maleic imides.

Typical olefinic dicarboxylic acids capable of forming cyclic imides which are capable of forming interpolymers with the above-mentioned butadienes are maleic acid and the substitution products thereof, such as halogen-maleic acids, chloro- or dichloromaleic acids, citraconic acid, dimethyl-maleic acid, or phenylmaleic acid, itaconic acid and the substitution products or derivatives thereof, such as methyl itaconic acid, also glutaconic acid and its substitution products. The derivatives of the imides substituted at the nitrogen which are suitable are the N-alkyl, N-cycloalkyl, N-aralkyl, N-aryl and substituted derivatives, for example, the methyl, ethyl, propyl, allyl, n-butyl, isobutyl, cyclohexyl, methylcyclohexyl, beta-cyanoethyl, epsilon-cyanopentyl, beta-chloroethyl, beta-hydroxy ethyl, phenyl, nitrophenyl, chlorophenyl, hydroxyphenyl, methoxy ethyl or butoxy ethyl derivatives. Mixtures of two or more imides may also be employed. The substituted imides can be prepared according to known methods, for instance, by causing the anhydride of the dicarboxylic acid to react with the appropriate amine so as to form the monoamide of the acid and subsequent splitting of water from the monoamide.

The proportions of the polymerizable components may be varied over a wide range, but it is preferable to use at least 50 per cent, by weight (based on the total polymerizable material), of the polymerizable butadiene in order to obtain a rubber-like material. It has been found that as low as 2 per cent of an olefinic cyclic imide interpolymerized with a butadiene imparts a desirable improvement in oil resistance. It is not intended that the invention be limited to the proportions set forth in the examples.

The mixed polymerization may be carried out by any of the methods known in the art such as in the presence of a solvent, or in the form of an emulsion, for instance, an aqueous medium, or without the use of a solvent or diluent. The polymerization is conveniently effected in aqueous emulsion which, if desired, can be effected as a single technical operation by agitating the mixture of polymerizable monomers with water in the presence of an emulsifying agent, and then continuing the agitation long enough for the polymerization to take place. Alternatively, the two substances to be polymerized may be separately emulsified in water and the two emulsions mixed in the polymerization vessel. Sodium oleate, triethanolamine stearate, sulfonated oleic acid, sodium-isopropyl-naphthalene sulfonate, sodium cetyl sulfate methosulfate, sodium rosinate, cetyl p-dimethylaminobenzoate, sodium salt of the sulfate ester of oleyl acetate, substituted betaines, i. e., C-cetyl betaine, and the like, and other salts derived from long chain bases and inorganic or organic acids are suitable emulsifying agents.

The polymerization proceeds readily and continues until the butadiene, particularly chloroprene, and olefinic cyclic imide have both completely or nearly completely entered into polymerization. Although a slight degree of acidity is sometimes convenient, the polymerizations have been found to proceed readily under essentially neutral, acid, or basic conditions. Pressures ranging from less than 1 atmosphere to 6000 atmospheres may be employed. There may also be added to the polymerization mixture, catalysts such as organic or inorganic peroxides, modifying agents such as sulfur dioxide, hydrogen sulfide, and mercaptans or modifying agents which are organic compounds containing chlorine directly attached to carbon. With chloroprene in particular, however, polymerization catalysts, modifying agents, or other additional compounds are unnecessary because the polymerization proceeds satisfactorily without them. In this respect of easy polymerization, the process of the present invention is superior to those of many other inventions for making synthetic rubber-like materials, because these latter are liable to be slow or incomplete or easily adversely influenced by impurities, or to yield good products only when the polymerization is stopped before completion. The temperatures at which polymerization takes place are also convenient; namely, between 5° C. and 80° C. and preferably about 30-40° C. However, the temperature and time of polymerization depends to a certain extent on the butadiene and olefinic cyclic imide which are being polymerized so that higher or lower temperatures than any of those mentioned are sometimes desirable. When the polymerization has proceeded as far as is desired, substances having an antioxidant and/or stabilizing action, such as phenyl-beta-naphthylamine or phenyl-alpha-naphthylamine and tetramethylthiuram disulfide, may be added to the mixture. These substances tend to stop any further polymerization in emulsion and to prevent oxidation and degradation of the polymers during subsequent treatment.

When the products of polymerization are produced in latex-like form, they may be obtained in massive form by coagulating the latex, separating the coagulum, washing, and drying. The coagulation may be effected by the addition of saturated sodium chloride solution, by freezing, or in other known ways, e. g., by the addition of acids, bases, aluminum sulfate or ethyl alcohol, depending upon the emulsifying agent which has been employed. Washing and drying may be effected by convenient means, as on heated rollers, e. g., using a rubber roller mill which is equipped with a device for washing, e. g., a water spray, and for steam heating of the rolls for drying when washing is completed. If the substance with antioxidant and/or stabilizing action, as mentioned above, were not added to the emulsion, they should advisedly be added during drying since they tend to stop undesired further polymerization and oxidation and also tend to give more plastic products. It is advisable not to dry above 60° C., as above 60° C. premature cure may set in. When it is desired to add other plasticizing agents, this can often be done conveniently during the washing. Chlorinated organic compounds, such as chlorinated naphthalene and chlorinated paraffin wax or any of the usual rubber or synthetic rubber plasticizers, are suitable as plasticizing agents. However, the products described herein are usually sufficiently plastic for most uses and do not require additional plasticizing agents.

The dry rubber-like materials can be compounded with vulcanizing agents, fillers, and reinforcing pigments on standard rubber machinery. Vulcanization is effected by a heat treatment and the vulcanizates are markedly superior to those obtained from natural rubber in their resistance to lubricating oils and hydrocarbon solvents and they also exhibit excellent tensile strength and elongation.

In general, compounding and vulcanizing of the chloroprene interpolymers may be carried out with the same technique as that used for example for unmodified chloroprene synthetic rubbers. Magnesia, wood rosin, zinc oxide and carbon black are convenient compounding and/or curing agents. Sulfur is usually employed as a vulcanizing ingredients for the butadiene-1,3 interpolymers and, if desired, can be added to the chloroprene interpolymers.

Various materials other than the butadienes and olefinic cyclic imides may be present during the polymerization as has been pointed out hereinbefore. Other modifications include polymerization in the presence of additional polymerizable substances, such as vinyl compounds including styrene, methyl methacrylate, vinyl acetate, acrylonitrile, maleate or fumarate esters, etc., in order to effect minor modifications in the properties of the rubber-like materials. The inclusion of such other polymerizable substances is not, however, generally necessary for the purposes of the invention. Other modifications include polymerization in dispersion media other than water, in solvents for the two monomers which are not solvents for the polymerized product, in the presence of other film-forming materials or paint or varnish adjuncts, as, for example, natural or synthetic resins, cellulose derivatives, drying oils, etc.

The products made according to the present invention differ from the usual synthetic rubber-like materials obtainable from butadiene-1,3 or chloroprene with other polymerizable materials in their outstanding resistance to oils and solvents. In addition, the products have excellent tensile strength, resilience and resistance to abrasion, and the unvulcanized materials have good working properties.

While still operating within the scope of the present invention, it should be apparent from the description, that it is possible to prepare final products differing widely in properties. Preferably, however, the invention is carried out as illustrated in the examples, by continuing the polymerization to the plastic stage and then separating the plastic mass from the unpolymerized material or any other undesired material and thereafter, either with or without the addition of compounding ingredients, carrying the polymerization on to the desired final stage, usually an elastic product.

The above remarks apply where the product is to be used in the massive form. The mass may, however, be dissolved in a suitable solvent, and the solution or dispersion resulting from carrying out the polymerization in emulsion or solution may be employed in a variety of ways, for example, as rubber substitutes for the preparation of dipped, coated, extruded, or impregnated articles, or films may be cast from the liquid compositions.

The polymer product may also be given further treatment to produce other products, also useful in a variety of ways. By way of example, the polymers may be halogenated or may be reacted with a hydrohalogen under a variety of conditions, i. e., in solutions, in the gaseous state, or in the liquid state.

Certain of the polymers are characterized by excellent softness and plasticity and are, therefore, eminently suited to particular uses. For example, they may be calendered on to cloth for the preparation of coated fabrics, of excellent quality, and they retain the properties of long life and resistance to various solvents and reagents. Solutions of the uncured polymers in benzene, toluene, or other suitable solvents may be used for coating and impregnating.

It is apparent that many widely different embodiments of this invention may be made without departing from the spirit and scope thereof, and, therefore, it is not intended to be limited except as indicated in the appended claims.

I claim:

1. A synthetic rubber-like polymeric material obtained by polymerizing, in aqueous emulsion, a mixture of about 98% to 50% of 2-chlorobutadiene-1,3 and about 2% to 50% of a N-substituted maleic imide.

2. A synthetic rubber-like polymeric material obtained by polymerizing, in aqueous emulsion, a mixture of about 98 per cent to 50 per cent of 2-chlorobutadiene-1,3 and about 2 per cent to 50 per cent of a N-alkyl maleic imide.

3. A synthetic rubber-like polymeric material obtained by polymerizing, in aqueous emulsion, a mixture of about 98 per cent to 50 per cent of 2-chlorobutadiene-1,3 and about 2 per cent to 50 per cent of N-methyl maleic imide.

GEORGE LOWRANCE DOROUGH.